United States Patent
Palamara et al.

(10) Patent No.: US 8,923,818 B2
(45) Date of Patent: Dec. 30, 2014

(54) CUSTOMER LTE ROUTER HUB

(71) Applicant: Cellco Partnership, Basking Ridge, NJ (US)

(72) Inventors: Maria E. Palamara, Denville, NJ (US); Miguel Carames, Martinez, CA (US)

(73) Assignee: Cellco Partnership, Basking Ridge, NJ (US)

( * ) Notice: Subject to any disclaimer, the term of this patent is extended or adjusted under 35 U.S.C. 154(b) by 126 days.

(21) Appl. No.: 13/649,495

(22) Filed: Oct. 11, 2012

(65) Prior Publication Data

US 2014/0106709 A1    Apr. 17, 2014

(51) Int. Cl.
*H04M 1/66*    (2006.01)
*H04W 8/18*    (2009.01)

(52) U.S. Cl.
CPC .................................... *H04W 8/18* (2013.01)
USPC ..................... 455/411; 455/435.1; 455/435.2

(58) Field of Classification Search
CPC ..... H04W 12/06; H04W 88/16; H04W 88/02; H04W 48/18; H04W 52/0254; H04W 52/0274; H04W 28/02; H04W 36/00; H04W 36/0027; H04W 36/18; H04W 36/22; H04W 4/001; H04W 76/00; H04W 36/14; H04W 4/02

See application file for complete search history.

(56) References Cited

U.S. PATENT DOCUMENTS

2011/0143753 A1* 6/2011 Rahman et al. ............ 455/432.1
2013/0155851 A1* 6/2013 Koodli et al. ................. 370/230

OTHER PUBLICATIONS

The LTE Network Architecture, A comprehensive tutorial; Alcatel Lucent, 2009.
3GPP TS 23.203 V9.11.0 (Mar. 2012), 3rd Generation Partnership Project; Technical Specification Group Services and System Aspects; Policy and charging control architecture (Release 9); Lte 2012.

* cited by examiner

*Primary Examiner* — Kathy Wang-Hurst

(57) ABSTRACT

The instant application describes a method for enabling a mobile station to receive high quality mobile voice and multimedia services over the LTE network across the world, regardless of the operating frequency band of the LTE network. The method includes steps of receiving, over the WiFi network, a connection request at a router from the mobile station; upon determining the mobile station is authorized to use the router for connecting to the LTE network, establishing a WiFi connection with the mobile station; receiving, at the router and from the mobile station, registration information for receiving an IMS voice service on the LTE network; and upon successful authentication of the registration information, providing the mobile station with the voice grade quality of service using the router regardless of a difference in operating frequency between the LTE network and the mobile station.

20 Claims, 7 Drawing Sheets

CUSTOMER LTE ROUTER HUB

BACKGROUND

Currently in networks using the 3GPP (3rd Generation Partnership Project) standard, roaming footprint control is typically a two step process. Roaming is the condition when a user takes her mobile station outside her Home Public Mobile Network (HPMN) and attempts to use it. The HPMN is the network serviced by the network provider in which the user has her subscription. A Visited Public Mobile Network (VPMN) is the network into which the user has entered. The networks may be a wireless mobile communication network and may be implemented as a network conforming to the IMS standard, and/or as a network conforming to the code division multiple access (CDMA) IS-95 standard, the 3rd Generation Partnership Project 2 (3GPP2) wireless IP network standard or the Evolution Data Optimized (EVDO) standard, the 3GPP LTE standard, the 4G LTE, the Global System for Mobile (GSM) communication standard, a time division multiple access (TDMA) standard or other standards used for public mobile wireless communications.

LTE is one of the best mobile broadband data technologies available and has been adopted by global carriers as their future technology direction. However, there is no harmonization of LTE spectrum. There are more than 30 different radio frequency (RF) bands that can be used for the LTE service, as well as differences in implementation in terms of carrier bandwidths (1.4 MHz to 20 MHz), paired or unpaired spectrum (FDD/TDD), and in the future, various permutations with LTE carrier aggregation. Packing all the potential power of LTE in a compact global phone form factor is a formidable challenge. Hence a need exists for a system that enables high quality mobile voice and multimedia services over the LTE network across the world, regardless of the operating frequency band of the LTE network and without a need for a large form-factor handset on an every-day basis.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

Figure 1:
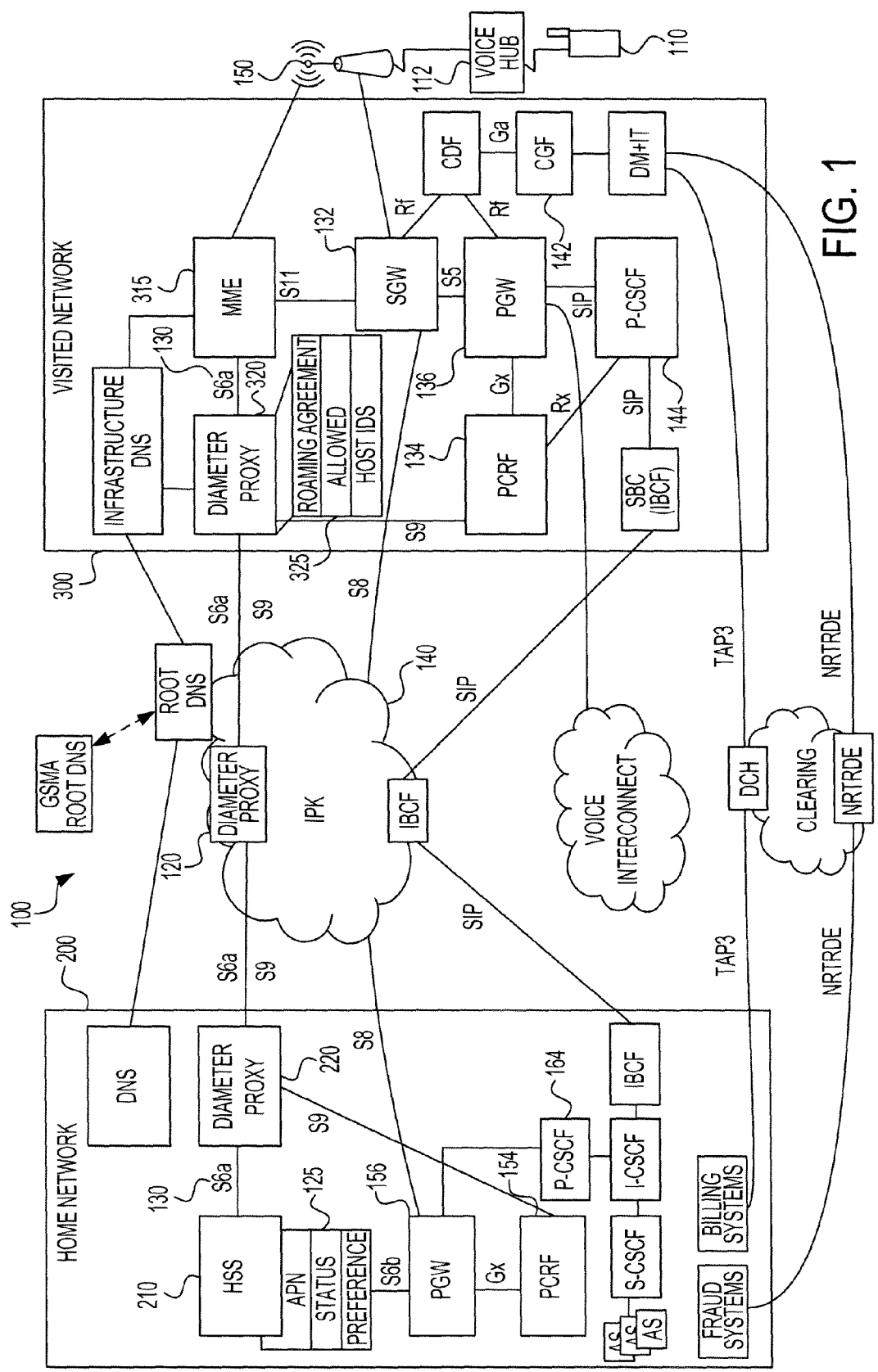
FIG. 1 is a functional block diagram describing a network diagram for LTE and IMS allowing an LTE and IMS-enabled voice hub and IMS-enabled voice device to roam from a Home Public Mobile Network (HPMN) to a Visited Public Mobile Network (VPMN)

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The various examples disclosed herein relate to techniques and equipment for achieving high quality media services over the LTE network across the world, regardless of the operating frequency band of the LTE network and without having to carry a larger form-factor handset on an every-day basis. The media services may include voice and/or video services. The large form-factor handset may be a handset that is not lightweight and/or slim because the handset includes within its packaging various radio technologies and frequencies the user may encounter in various LTE networks. Specifically, the various examples disclosed herein relate to a voice hub offering the radio technologies and frequencies that the user may encounter in various LTE networks in different countries. The voice hub may be configured to bridge the user's mobile station (using short-range wireless access) into the visited LTE network and may assure the same or substantially same quality of service (QoS) for voice and multimedia communications that the user receives from the user's home network.

To illustrate one specific example, upon power up the voice hub registers with an LTE network and broadcasts, over a WiFi network, an identifier of the voice hub to a mobile station. Although in this specific example, the communications between the voice hub and the mobile station happen over the WiFi network; in another example, the communications may happen over other short range wireless communication networks such as, for example, Bluetooth, Digital Enhanced Cordless Telecommunication (DECT), Zigbee, MiWi, Bluetooth Low Energy (BLE), or any similar short range wireless communication technologies. In response to the mobile station receiving such a broadcast, the voice hub receives, over the WiFi network, a connection request from the mobile station. The voice hub then determines whether the mobile station is authorized to use the voice hub for connecting to the LTE network. Upon determining the mobile station is authorized to use the voice hub for connecting to the LTE network, the voice hub establishes a WiFi connection with the mobile station. Thereafter, the voice hub receives from the mobile station registration information for a voice service on the LTE network. The voice hub sends the registration information to the LTE network for authentication. Upon successful authentication of the registration request, the voice hub enables the mobile station to make a voice call over the LTE network. To this end, the initial wireless network (e.g., the WiFi network) used for communication between the voice hub and the mobile station is different from the wide area wireless network (e.g., the LTE network) used for communication between the mobile station and another mobile station. It should be noted that there may be several other transport networks that the call transverses prior to reaching the destination mobile station.

In one implementation, the voice hub is connected to a power source while the user enjoys mobility when operating the mobile phone by, for example, talking, visiting social networking sites, or playing games. To this end, the voice hub may reduce the power drain on the user's mobile station, which may be using a lower power level while communicating with the voice hub over a WiFi network. This is because WiFi network and other short range networks require lower transmit power from the mobile station than LTE network and other wide area networks. The voice hub may leverage IMS Voice over LTE with HD-Voice technology, and industry standard Rich Communication Services with a VoLTE-compatible mobile Smartphone device to provide comparably good voice quality as the user receives at his/her home network. In one implementation, the voice hub supports up to five attached WiFi equipped phones, although in practice the limits may be higher or lower and would be determined by the LTE network and voice hub designs.

Reference now is made in detail to the examples illustrated in the accompanying drawings and discussed below. FIG. 1 is a functional block diagram describing a network diagram for LTE and IMS allowing an LTE and IMS-enabled voice hub UE 112 and IMS-enabled voice device 110 to roam from a HPMN 200 to a VPMN 300. Both the HPMN 200 and the VPMN 300 may have all of the features, hardware, and systems of other networks, however, in this example, only the relevant portions of the network are described. The HPMN 200 can have a Home Subscriber Server (HSS) 210. The HSS 210 evolved from a Home Location Register (HLR), In 3GPP networks, and particularly in the LTE architecture (for 3G and 4G networks), the HSS 210 can be a database of user (subscriber) information, i.e., customer profiles 125. The user information may include account information, account status, user preferences, features subscribed to by the user, user's current location, and allowable APNs. In roaming scenarios, the HSS 210 in the HPMN 200 provides the user profile to a Mobility Management Entity (MME) 315 in the VPMN 300.

Figure 2:
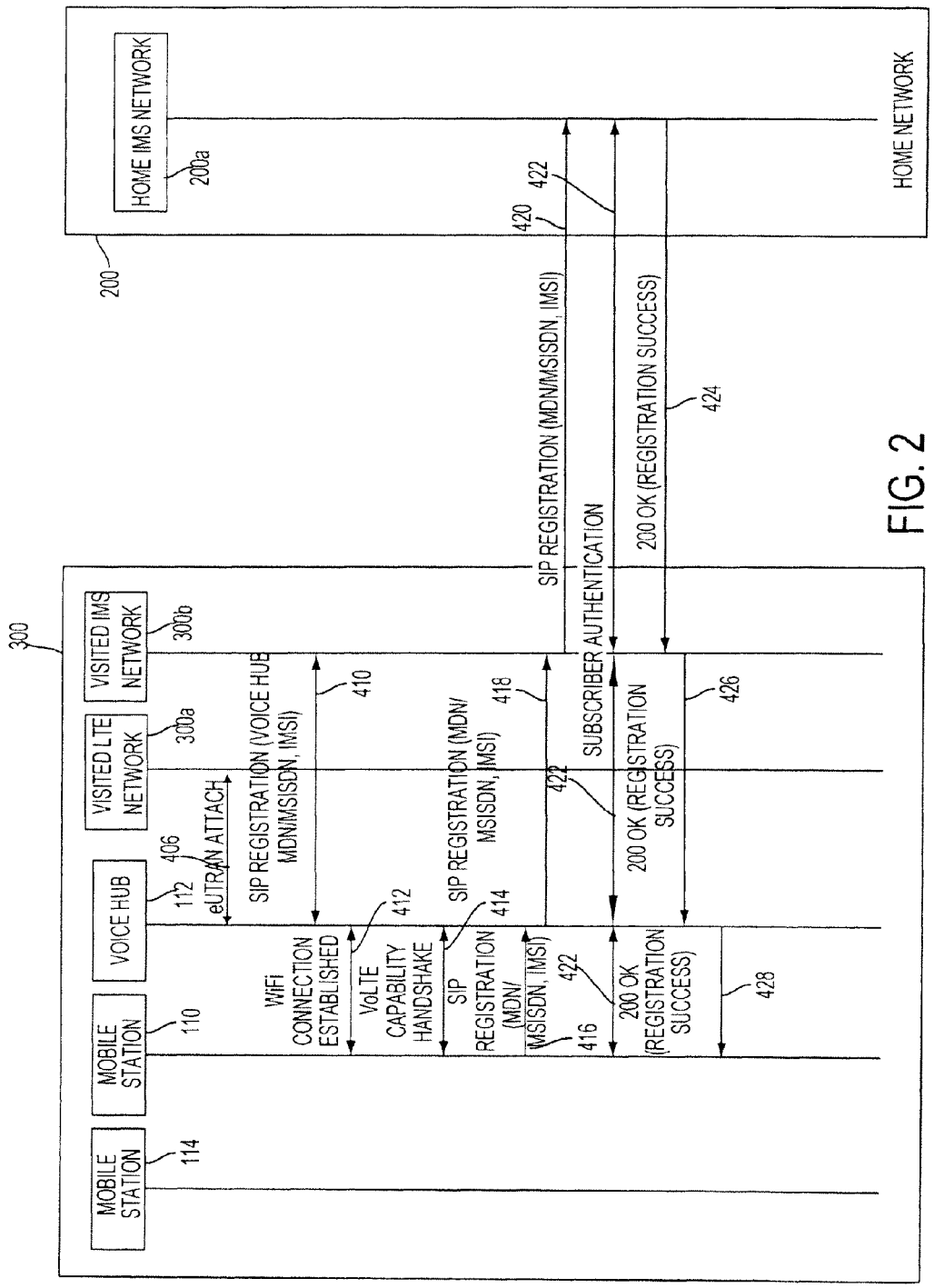
FIG. 2 illustrates an example of an IP Multimedia Subsystem (IMS) registration message flow diagram when the user's IMS mobile station roams into the VPMN shown in FIG. 1 and communicates with the VPMN through a voice hub.

The MME 315 is a control-node for the LTE access-network, in that it can be a single point (or "node") within the network that integrates numerous core functions and control over network flow, load sharing, etc. It can be responsible for tracking, paging, and retransmission procedures to the voice hub 112. The MME 315 can also be involved in the voice hub's activation/deactivation of service flows (also known as bearers) and is also responsible for authenticating the voice hub when it is roaming, by interacting with the HSS 210. FIG. 2 illustrates the VPMN 300, through the base station 150, SGW 132, and MME 315, registering and authenticating the mobile station 110 in a back and forth communication 422 to the home IMS network. As shown in FIG. 2, the VPMN 300 includes both Visited LTE Network 300a and the Visited IMS Network 300b. The Visited LTE Network 300a includes LTE servers such as, for example, Policy Control and Charging Rules Function (PCRF) 134, MME 315, PDN Gateway (PGW) 136, Serving Gateway (SGW) 132. The Visited IMS Network 300b includes IMS servers such as, for example, Proxy Call Session Control Function (P-CSCF) 144. The authentication procedure 422 between the voice hub 112 and the MME 315 can involve multiple messages per current 3GPP standards (Authentication Request/Response, Security Mode Command/Complete, etc). The content and frequency of these messages are known to those of ordinary skill in the art.

The HSS 210 communicates with the MME 315 using an S6a protocol 130. The communication between HSS 210 of the HPMN 200 and the MME 315 of the VPMN 300 may traverse zero, one, or multiple diameter proxies. In the illustrated example, the communication occurs through diameter proxies 120, 220, and 320. Specifically, the S6a protocol messages 130, in the example of FIG. 1, can pass from the HSS 210 to the diameter proxy 220, over the network 140 and through diameter proxy 120 to the VPMN's 300 diameter proxy 320 and to the MME 315. The diameter proxy 320 is a border gateway for the diameter protocol. The diameter protocol is a next generation Authentication, Authorization, and Accounting (AAA) protocol for IP communication networks. The protocol facilitates the exchange of AAA related information within the network. A more complete description of the diameter protocol can be found in a Request for Comments (RFC) 3588 (as published by the Internet Society, September 2003—which can be found at http://www.ietf.org/rfc/rfc3588.txt) which is incorporated herein by reference in its entirety. The diameter proxies 220, 320 can be considered as the only point of contact into and out of a network (either HPMN or VPMN) for diameter traffic.

The S6a protocol 130 enables transfer of profile and authentication data for authenticating/authorizing user access between the HSS 210 of the HPMN 200 and the MME 315 of the VPMN 300. The MME 315 can be responsible for a number of tasks, as noted above.

The HPMN 200 further includes PGW 156, PCRF 154, and P-CSCF 164. The VPMN 300 includes SGW 132, PGW 136, PCRF 134. The PCRF 134, 152 is configured to specify the QoS for the bearer based on QoS Class Identifier (QCI) and ensures such specification is in accordance with the user's subscription profile. The PGW 136, 156 is configured to assign IP addresses to the user equipment. For example, the PGW 136 is configured to assign IP address to the voice hub 112. The PGW 136, 156 is also responsible for QoS enforcement based on the specified QoS by the PCRF 134, 154. The SGW 132 is configured to receive the user's IP packets. The SGW 132 is configured to serve as a mobility anchor for the bearers when the voice hub 112 moves from one eNodeBs 150 to another.

In the illustrated example, the MME 315 also communicates with the base station/antenna 150 to receive information and requests from the voice hub 112. The voice hub 112 is configured to bridge the user's mobile station 110 into the visited LTE network while the user's mobile station 110 communicates over WiFi. The voice hub 112 may assure the user the same or substantially same QoS from the visited LTE network than QoS the user receives from the user's home network when the user would communicate with the network using LTE directly. The voice hub 112 may be associated with the user's home network or may be associated with the visited network.

To illustrate one specific example, a user from abroad roaming into the Verizon Wireless™ network in the United States may obtain the voice hub 112 at the airport. In this scenario, the voice hub 112 may be associated with the visited network (e.g., Verizon Wireless™ network) and may have Verizon Wireless™ credentials. In another specific example, the user may bring into the visited network (e.g., Verizon Wireless™) the user's own voice hub 112. In this scenario, the voice hub 112 may be associated with the user's home network and may have the user's home network credentials.

In either case, the voice hub 112 is configured to bridge the user's mobile station 110 into the VPMN 300, regardless of the operating frequency operating band of the VPMN 300. In the foregoing examples, it is assumed that the voice hub 112 is associated with the VPMN 300 (and thus is initially capable of communicating with the VPMN 300 without modification)

FIG. 2 illustrates an example of an IP Multimedia Subsystem (IMS) registration message flow diagram when the user's IMS mobile station roams into the VPMN 300 shown in FIG. 1 and communicates with the VPMN 300 through a voice hub 112. In keeping with the previous example, the VPMN 300 may be a Verizon Wireless™ network in the United States and the roaming user may be from the United Kingdom. Upon entering the United States, the roaming user may wish to utilize his/her phone. However, the VPMN 300 may be operating on a different frequency band than the one supported by the roaming user's mobile station 110. In this case, the roaming user may purchase the voice hub 112 from the airport in the United States, for example. The voice hub 112 may be configured with the VPMN's 300 credentials. When the voice hub 112 is turned ON the voice hub 112 sends an attachment request 400 through the base station 150 to the Visited LTE Network 300a of the VPMN 300. The voice hub 112 sends an attachment request 400 through the base station 150 to the MME 315 in the VPMN 300. The attachment request 400 may be a eUTRAN attachment request which is an LTE air interface. When the voice hub 112 attached to the Visited LTE Network 300a, a mutual authentication of the voice hub 112 and the Visited LTE Network 300a is performed between the voice hub 112 and the MME 315. Upon successful attachment, the voice hub 112 goes through standard IMS registration. As a part of the IMS registration, the mobile station 110, though the voice hub 112, communicates relevant IMS registration information (IMSI, MDN, MS-ISDN) to the Visited IMS Network 300b (Step 410). The registration procedure 410 between the voice hub 112 and the Visited IMS Network 300b can involve multiple messages per current 3GPP standards (Authentication Request/Response, Security Mode Command/Complete, etc). The voice hub 112, for example, provides the Visited IMS Network 300b with the Mobile Directory Number (MDN) and/or International Mobile Subscriber Identity (IMSI) associated with the voice hub 112. This information may be passed along in the S6a message 130 to an HSS for an authentication. The IMSI is a unique identifier stored inside the voice hub 112 and transmitted to the VPMN 300 or HPMN 200. In this Verizon Wireless example the HPMN and the VPMN are one and the same for the voice hub 112, and diameter proxies would not be required since the HSS and MME can communicate securely within the same Verizon network.

Based on the received registration information, the MME 315 determines that the voice hub 112 subscribes to its particular network and that the voice hub 112 needs authorization to allow the mobile station 110 access to the network. The MME 315 sends the authorization information request to the HSS associated with the VPMN 300. Here, the HSS analyzes the request based on its subscriber data and determines that the voice hub 112 is permitted to access the VPMN 300. The HSS, for example, can identify the voice hubs associated with the VPMN 300. If the voice hub 112 is not associated with the VPMN 300 and instead is associated with the HPMN 200, the MME 315 may pass the credential information to the HSS 210 and wait for a response from the HSS 210.

As can be seen in FIG. 2, the VPMN 300 can handle the authentication of the voice hub 112 since the voice hub 112 is part of the VPMN 300. Turning to an approval, once the SIP registration and authentication process 410 is completed, the voice hub 112 has LTE network connectivity via the Visited LTE Network 300a and the IMS connectivity via the Visited IMS Network 300b. The voice hub 112 may have rudimentary web server capabilities—typically available on WiFi access points and routers to enable browser based setup by a connected PC. The mobile station 110 may have wireless HTTP browser and/or application capabilities—typical for smart phones.

After connecting with the VPMN 300 (e.g., the Visited LTE Network 300a and the Visited IMS Network 300b) and establishing a data connection with the VPMN 300, the voice hub 112 broadcasts its ID over its WiFi interface. In one implementation, the voice hub 112 is prescribed to include an ID with a specific combination of letters, e.g., the word VoLTE may be first five letters if the voice hub 112 is capable of the VoLTE handshake. Additional letters in the SSID can be pre-programmed and fixed in the device (unique to each device) or potentially can be customized by the user. The voice hub 112 may support a fixed IP address for its web server facing the WiFi side of the voice hub 112, e.g. 192.168.1.2. This IP address may be used exclusively for the handshake negotiation with VoLTE capable WiFi devices (e.g., the mobile station 110).

The user sets up the mobile station 110 to attach to the voice hub's WiFi in the normal method, choosing the mobile station 110 WiFi setup mechanism. When the mobile station 110 scans for available WiFi networks, the mobile station 110 sees the VOLTExxxx SSID of the voice hub 112 and displays the SSID on the screen as one of possibly several available WiFi networks. The user of the mobile station 110 chooses the VoLTExxxx SSID and requests a connection to the voice hub's web server (e.g., 192.168.1.2).

Upon successful connection with the voice hub 112 (Step 412), the mobile station 110 launches a VoLTE handshake application (Step 414). The mobile station 110 may automatically see the chosen SSID begins with VoLTE and may automatically launch the VoLTE handshake application. Alternatively, the user of the mobile station 110 may manually launch the VoLTE handshake application. For example, the mobile station 110 may present a popup message to the user to inform the user of the availability of voice communication over the established LTE connection with the voice hub 112. The message may be, for example, "you are connected to a voice compatible LTE router, would you like to register for voice services?" If the user selects "Yes," the mobile station 110 may launch the VoLTE handshake application. Upon launching the VoLTE handshake application, the mobile station 110 goes through standard IMS registration and the voice hub 112 becomes a SIP proxy. As a part of the IMS registration, the mobile station 110 communicates to the voice hub 112 relevant IMS registration information (IMSI, MDN, MS-ISDN), using a secure https interface with the voice hub's 112 web server (Step 416).

Using the LTE air interface, the voice hub 112, acting as a SIP proxy, relays the information to the Visited IMS Network 300b which in turn attempts to confirm the registration with the user's home network (e.g., HPMN 200). To this end, the voice hub 112 forwards the registration information to the Visited IMS Network 300b (Step 418). The Visited IMS Network 300b communicates with the Home IMS Network 200a (Step 420). This communication is typically over the network 140, which can use an internetwork packet exchange (IPX). On the HPMN 200 side, the diameter proxy 220 forwards the authorization and registration information request to the SIP registrar and HSS 210 in the Home IMS Network 200a.

The Home IMS Network 200a then reviews the request and authenticates the mobile station 110 through the Visited IMS Network 300b and the voice hub 112 (Step 422). Upon successful authentication, the Home IMS Network 200a transmits an authorization information answer back to the Visited IMS Network 300b (Step 424). The Visited IMS Network 300b then transmits the registration confirmation to the voice hub 112 (Step 426), which then transmits the registration confirmation to the mobile station 110 (Step 428). In this manner, the mobile station 110 is registered with the Visited IMS Network 300b and the Home IMS Network 200a now knows how to find it in the event of incoming calls. Similar registration process may take place for the other mobile stations (e.g., mobile station 114).

If the registration is successful, the voice hub 112 sends a message to the mobile station 110 informing the user of the mobile station 110 that the voice registration was successful and the user may now be able to send and receive calls from the mobile station 110. For calls, the voice hub 112 may relay SIP messages and standard VoLTE protocols over the WLAN interface to the mobile station 110. If the mobile station 110 loses its WiFi connection to the voice hub 112, the voice hub 112 may de-register the user from the IMS so that the IMS does not attempt to deliver any further calls to the mobile station 110.

Figure 3:
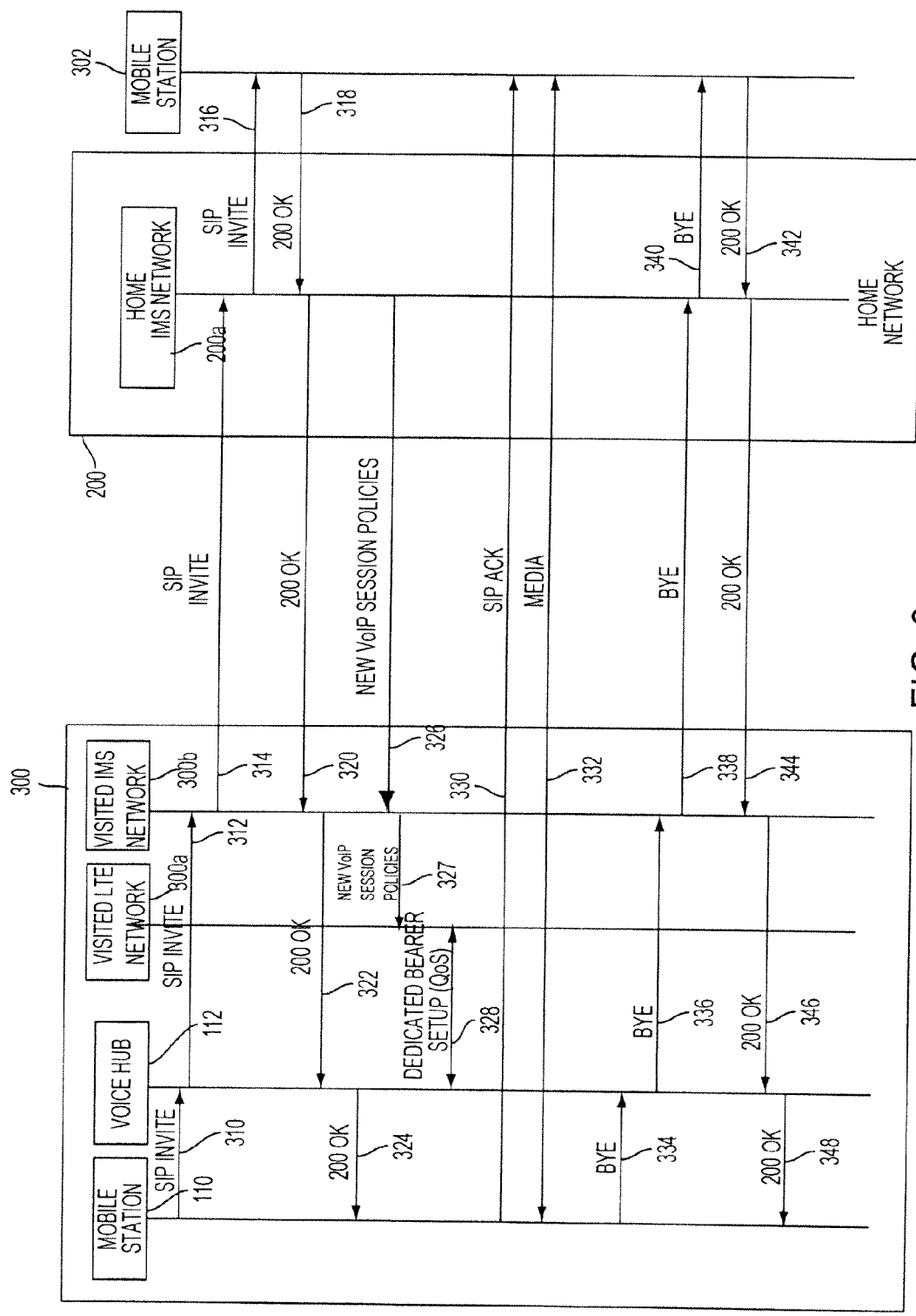
FIG. 3 illustrates an exemplary flow diagram when a user of a roaming IMS mobile station makes a voice or multimedia call from the VPMN shown in FIG. 1 to a user of another mobile station at the HPMN through a voice hub.

FIG. 3 illustrates an exemplary flow diagram when a user of a roaming IMS mobile station 110 makes a voice or multimedia call from the VPMN 300 shown in FIG. 1 to a user of another mobile station 302 at the HPMN 200 through a voice hub 112. Upon dialing the mobile station 302, the mobile station 110 sends a SIP invite message to the voice hub 112 (Step 310). The voice hub 112 forwards the SIP invite message to the Visited IMS Network 300b (Step 312). The Visited IMS Network 300b forwards the message to the Home IMS Network 200a (Step 314), and the Home IMS Network 200a forwards the message to the mobile station 302 (Step 316). Upon receiving the SIP invite message, the mobile station 302 returns a message 200 OK to the Home IMS Network 200a (Step 318). The Home IMS Network 200a forwards the message 200 OK to the Visited IMS Network 300b (Step 320). The Visited IMS Network 300b forwards the 200 OK message to the voice hub 112 (Step 322). The voice hub 112 forwards the 200 OK message to the mobile station 110 (Step 324). The content of the SIP signaling (e.g., SIP invite and 200 OK messages) between the mobile station 110 and the mobile station 302 may involve multiple messages per current 3GPP standards. The content and frequency of these messages are known to those of ordinary skill in the art. Once the 200 OK message is received at the mobile station 110, the ring tone may be heard until the user of the mobile station 302 answers the phone.

Once the SIP signaling between the mobile station 110 and the mobile station 302 is established, the voice communication between the mobile station 110 and the mobile station 302 may take place. The voice hub 112 has a IP connectivity to the VPMN 300 and can provide various services such as Voice over IP (VoIP), web browsing, or FTP downloads. For example, the user of the mobile station 110 having WiFi connectivity with the voice hub 112 may be engaged in a VoIP call. Similarly, the user of the mobile station 110 may utilize a web browser to surf the Internet. Unlike the traffic associated with the web browsing, the voice traffic in the established LTE pipe may require a quality of service (QoS). To this end, the Home IMS Network 200a sends a new VoIP session policies request to the Visited IMS Network 300b (Step 326). The Visited IMS Network 300b forwards the new VoIP session policies to the Visited LTE Network 300a (Step 327).

The new VoIP session policies may dictate the QoS that is required for the VoIP between the mobile station 110 and the mobile station 302. Based on the new VoIP session policies, a dedicated bearer setup for QoS takes place between the Visited LTE Network 300a and the voice hub 112 (Step 328). For example, a bearer with the specified QoS may be established between SGW 132 and the voice hub 112 (Step 328).

Figure 4:
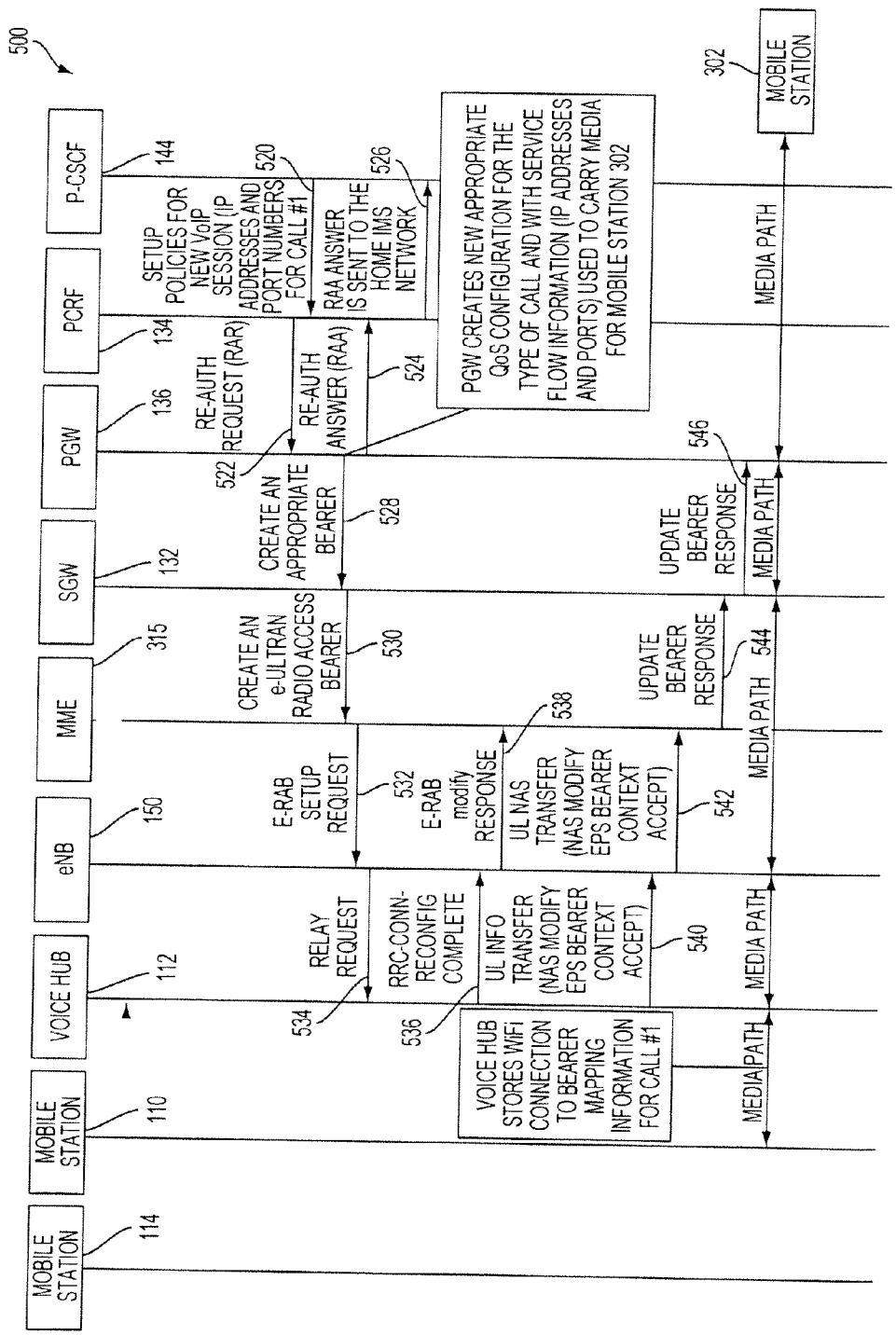
FIG. 4 illustrates an exemplary "success" call flow for a call from/to a roaming mobile station demonstrating LTE bearer setup through a voice hub using appropriate Quality of Service (QoS) managed and controlled at the VPMN shown in FIG. 1 and expanding on the step of setting up dedicated bearer for QoS shown in FIG. 3.

The detailed procedure for establishing a bearer with a defined QoS between the voice hub 112 and the Visited LTE Network 300a (Step 328) is described with respect to FIG. 4. Once the bearer with a defined QoS is established, the mobile station 110 is informed and sends a SIP acknowledgement to the mobile station 302 (Step 330) and the voice traffic travels through the LTE pipe (Step 332). Once the communication is over, the mobile station 110 sends a BYE message to the voice hub 112 (Step 334). The voice hub 112 forwards the BYE message to the Visited IMS Network 300b (Step 336). The Visited IMS Network 300b forwards the BYE message to the Home IMS Network 200a (Step 338), which forwards the BYE message to the mobile station 302 (Step 340).

Upon receiving the BYE message, the mobile station 302 communicates a 200 OK message to the Home IMS Network 200a (Step 342). The Home IMS Network 200a forwards the 200 OK message to the Visited IMS Network 300b (Step 344). The Visited IMS Network 300b forwards the 200 OK message to the voice hub 112 (Step 346), which forwards it to the mobile station 110 (Step 348). The content of the SIP BYE signaling (e.g., SIP invite and 200 OK messages) between the mobile station 110 and the mobile station of the called party 302 may involve multiple messages per current 3GPP standards. The content and frequency of these messages are known to those of ordinary skill in the art.

FIG. 4 illustrates an exemplary "success" call flow 500 for a call from/to a roaming mobile station 110 demonstrating LTE bearer setup through a voice hub 112 using appropriate QoS managed and controlled at the VPMN 300 shown in FIG. 1 and expanding on the step 328 of setting up dedicated bearer for QoS shown in FIG. 3. The flow 500 does not show the IMS interactions but initiates at the P-CSCF 144, which handles the interactions between the Home IMS Network 200a and the Visited IMS Network 300b for the mobile station 110. Initial conditions may include the voice hub 112 already having an IP address using the IMS APN and a session association with the P-CSCF 144 before this process begins. In keeping with the previous example, the voice hub 112 is using the Visited LTE Network 300a as a home user (e.g., the voice hub 112 is part of the Visited LTE Network 300a). However, the voice hub 112 may be using the Visited LTE Network 300a as either a home user or a roaming user (e.g., the voice hub 112 may be part of the HPMN 200 or the VPMN 300). The mobile station 110 may already associate itself with the voice hub 112, and the registration to its home IMS (e.g., the Home IMS Network 200a) has occurred as described in FIG. 2. The Home IMS Network 200a receives an incoming call for the mobile station 110. The Home IMS Network 200a knows the user is registered in the Visited IMS Network 300b and can be reached via the P-CSCF 144. The call control signaling (SIP, or Session Initiation Protocol) is sent to the mobile station 110 from the Home IMS Network 200a via the local or visited P-CSCF 144. The P-CSCF 144 knows that the mobile station 110 is associated with the voice hub 112, and the user is connected via WiFi to the voice hub 112 with the same LTE access connection.

The P-CSCF 144 behaves like an Application Function (AF) in the LTE reference model and asks PCRF 134 to setup policies for new VoIP session (e.g., IP addresses and port numbers) (Step 520). Specifically, the P-CSCF 144 may ask for a QoS bearer to be setup in the visited LTE network between the voice hub 112 and the Visited IMS Network 300b mobile station's 110 home IMS (e.g., the Home IMS Network 200a) (Step 520). The QoS bearer request may have adequate Guaranteed Bit Rate (GBR) and delay/Jitter parameters to support a voice and/or video conversation between the mobile station 110 and the mobile station 302 (e.g., QCI-1 or 2, respectively, in 3GPP terminology). Using the 3GPP Rx interface, the P-CSCF 144 requests the PCRF 134 to establish a dedicated voice and/or video bearer session be set up in the LTE access network. The PCRF 134 asks the PGW 506 in the local LTE network to associate a conversational voice and/or video bearer with the voice hub's 112 IP address associated with the IMS APN, using the GBR and QCI parameters as requested by the P-CSCF 144 in step 520. This is requested using the 3GPP Gx interface between the PCRF 134 and the PGW 136. Prior to requesting the dedicated voice and/or video bearer, the PCRF 134 may check whether the voice hub 112 is authorized to request this bearer service (Step 522).

The PGW 136 confirms the authorization of bearer request to the PCRF 504 (Step 524) and commences to establish the bearer in the LTE access network (Step 528). For example, the PGW 134 may check the subscriber's profile repository in the HSS 210 to confirm authorization for the requested bearer service. The PCRF 134 confirms the bearer creation to the P-CSCF 144 using the Rx interface (Step 526), which in turn relays the authorization to the mobile station's 110 home IMS network (e.g., the Home IMS Network 200a). This indicates that the Home IMS Network 200a can continue processing the call, e.g. providing ring back tone to the calling party as the LTE bearer setup continues.

The PGW 136 requests the SGW 132 to create an appropriate QoS bearer in the local LTE network using the 3GPP S5 interface (Step 528). The SGW 132 may be more local than PGW 136 and may be typically one end of the last leg of transmission between the core network and the eNodeB (eNB) 150 over the backhaul network. The SGW 132 may have a direct correspondence to the MME 315 and the eNB 150 and may be the local mobility anchor for the LTE bearer; whereas, the PGW 136 may be the IP address anchor for the LTE bearer.

In response to the QoS bearer request from the PGW 136, the SGW 132 requests the MME 315 to create an E-UTRAN radio access bearer (E-RAB) in the eNB 150 where the voice hub 112 is currently physically located using the 3GPP S11 interface (Step 530). E-UTRAN or Evolved UMTS Terrestrial Radio Access Network is the formal standards name for LTE radio access. The MME 315 determines the eNB 150 to which the voice hub 112 is attached and establishes the E-RAB. In one implementation, the MME 315 determines the eNB 150 to which the voice hub 112 is attached based on tracking the mobile station's 110 location throughout the network. The MME 315 sends an E-RAB setup request to the target eNB 150 using the 3GPP S1-MME control interface (Step 532). The target eNB 150 checks that it has adequate resources (available spectrum, processing power, etc.) to service the MME's 315 request for the dedicated LTE bearer. Assuming it does, the eNB 150 relays the request to the voice hub 112 over the LTE air interface (LTE-uu) via the RRC-Conn-Reconfig message (Step 534).

The voice hub 112 confirms that it will reconfigure the session to accommodate the requested QoS bearer by responding to the eNB 150 with the RRC-Conn-Reconfig-Complete message (Step 536). The eNB 150 confirms the bearer setup to the MME 315 using the E-RAB-Modify-Response message (Step 538). The voice hub 112 modifies its LTE-uu configuration parameters to accommodate the requested QoS bearer associated with voice traffic, including the appropriate IP port information for the Evolved Packet System (EPS) bearer. EPS is the formal standards name for the complete LTE system, including the E-UTRAN and the EPC, or Evolved Packet Core. The voice hub 112 communicates these parameters to the eNB 150 using the UL-Info-Transfer message as indicated, carrying Non-Access Stratum (NAS) signaling information destined for the MME 315 (Step 540). Independent of the LTE signaling, the voice hub 112 associates this stream of data with the mobile station's 110 connected to the voice hub 112 via WiFi.

The eNB 150 relays the NAS signaling information to the MME 315 and sets up a dedicated LTE media bearer with the voice hub 112 (Step 542). The MME 315 interprets the NAS information from the voice hub 112 with the appropriate IP port numbers containing the specified dedicated bearer and relays the relevant information to the SGW 132 (Step 544). The SGW 132 relays the IP bearer information to the PGW 136 and sets up a media bearer context with the eNB 150 and the PGW 136 corresponding to the dedicated bearer for the voice call (Step 546). The media path associated with the voice call is now associated with the voice hub's 112 IP address and the voice call media path is complete.

Figure 5:
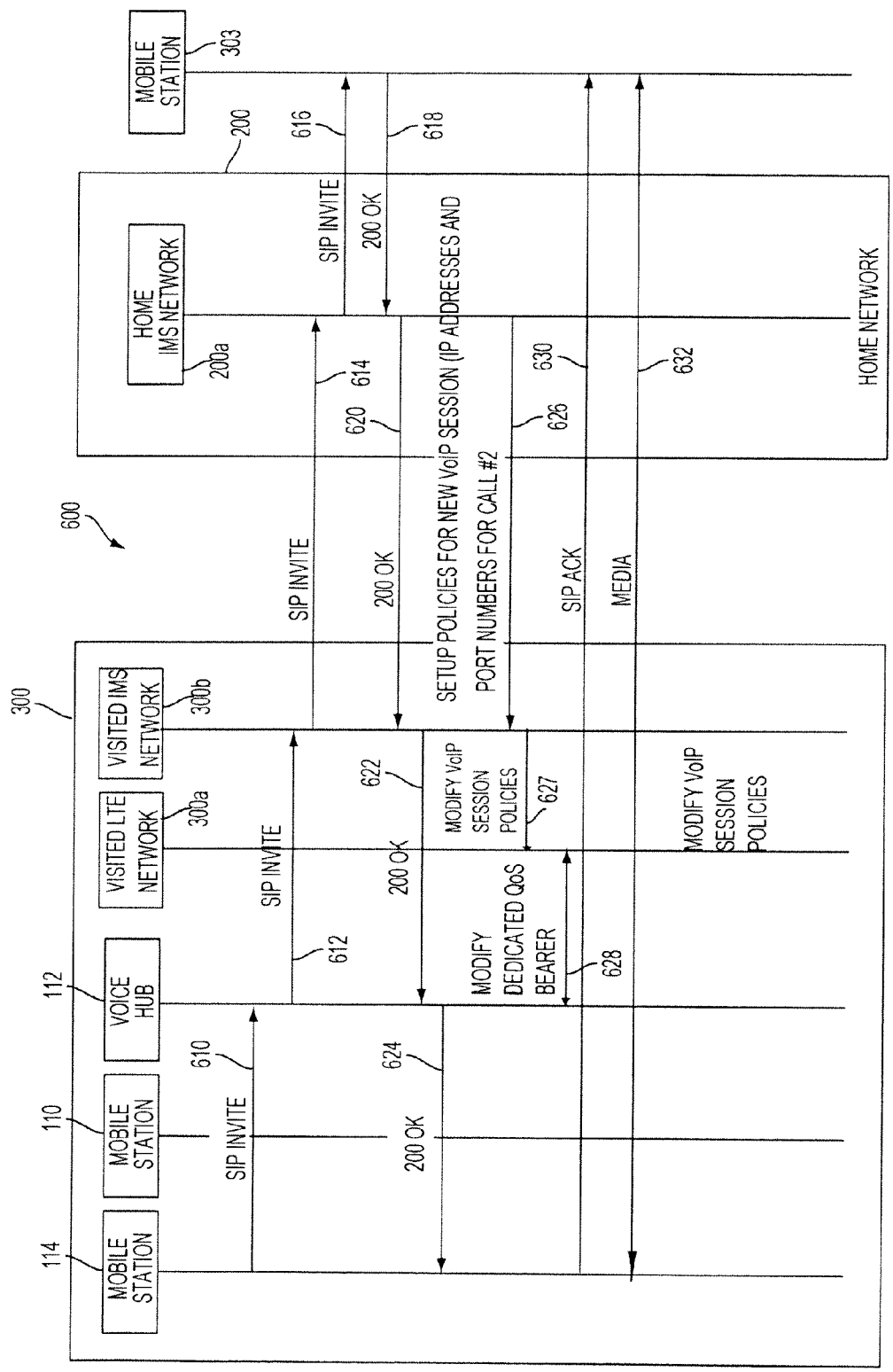
FIG. 5 illustrates an exemplary flow diagram when a user of a second roaming mobile station makes a call from the VPMN to a user of the mobile station at the HPMN through the same voice hub as the one shown in FIG. 3.

FIG. 5 illustrates an exemplary flow 600 when a user of a second roaming mobile station 114 makes a call from the VPMN 300 to a user of the mobile station 303 at the HPMN 200 through the same voice hub 112 as the one shown in FIG. 3. Call from the mobile station 110 to the mobile station 302 is ongoing when the mobile station 114 initiates a separate call to the mobile station 303 through the same voice hub 112 as the one being used for the communication between the mobile stations 110 and 302. Upon dialing the MDN associated with the mobile station 303, the mobile station 114 sends a SIP invite message to the voice hub 112 (Step 610). The voice hub 112 forwards the SIP invite message to the Visited IMS Network 300b (Step 612). The Visited IMS Network 300b forwards the message to the Home IMS Network 200a (Step 614) and the Home IMS Network 200a forwards the message to the mobile station 303 (Step 616). Upon receiving the SIP invite message, the mobile station 303 returns a message 200 OK to the Home IMS Network 200a (Step 618). The Home IMS Network 200a forwards the message 200 OK to the Visited IMS Network 300b (Step 620). The Visited IMS Network 300b forwards the 200 OK message to the voice hub 112 (Step 622), and the voice hub 112 forwards the 200 OK message to the mobile station 114 (Step 624). The content of the SIP signaling (e.g., SIP invite and 200 OK messages) between the mobile station 114 and the mobile station 303 may involve multiple messages per current 3GPP standards. The content and frequency of these messages are known to those ordinary skill in the art. Once the 200 OK message is received at the mobile station 114, the ring tone may be heard until the user of the mobile station 303 answers the phone.

Once the SIP signaling between the mobile station 114 and the mobile station 303 is established, the voice communication between the mobile station 114 and the mobile station 303 may take place. Unlike the web browsing data traffic, the voice traffic in the established LTE pipe may require a predefined QoS. Although the existing bearer has been set up with a necessary QoS for voice or multimedia calls over the LTE pipe, the bearer may not be able to support more than one call. Specifically, QoS of the previously established bearer may be sufficient for only the existing call between the mobile stations 110 and 302. To this end, the Home IMS Network 200a sends a new VoIP session policies to the Visited IMS Network 300b (Step 626). The new VoIP session policies may dictate the QoS that is required for the voice communication between the mobile station 114 and the mobile station 303 while there is an existing voice communication between the mobile station 110 and the mobile station 302. Based on the new VoIP session policies, modification request for QoS takes place between the Visited IMS Network 300b and the voice hub 112 (Step 628). The detailed procedure for establishing the QoS between the voice hub 112 and the Visited IMS Network 300b (Step 628) is described with respect to FIG. 6. Once the modification for QoS is achieved, the mobile station 114 sends a SIP acknowledgement to the mobile station 303 (Step 630) and the voice traffic travels through the LTE pipe (Step 632).

Figure 6:
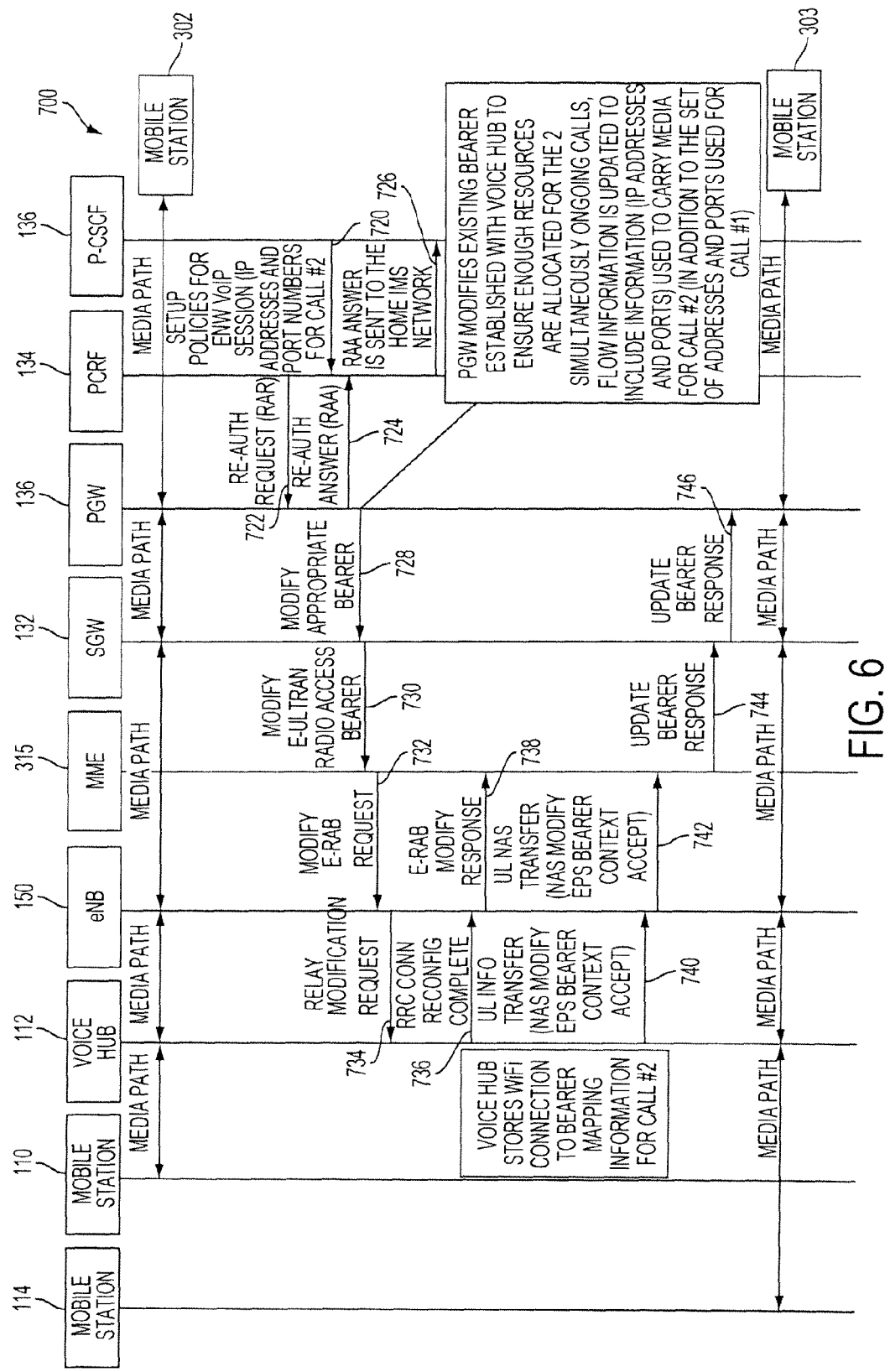
FIG. 6 illustrates an exemplary "success" call flow for adding a second call to/from a mobile station with LTE bearer setup modifying QoS managed and controlled at the VPMN shown in FIG. 1 and expanding on the step of modifying dedicated bearer for QoS shown in FIG. 5.

FIG. 6 illustrates an exemplary "success" call flow 700 for adding a second call to/from a mobile station 114 with LTE bearer setup modifying QoS managed and controlled at the VPMN 300 shown in FIG. 1 and expanding on the step 628 of modifying dedicated bearer for QoS shown in FIG. 5. The flow 700 is similar to the flow 500; however, instead of setting up dedicated LTE bearers, the flow 700 shows modification of the bearer already established by flow 500 to add more bandwidth to the existing voice bearer. Similar to the flow 500, the flow 700 does not show the IMS interactions, but initiates at the P-CSCF 144, which handles the interactions between Home IMS Network 200a and Visited IMS Network 300a for the mobile station 114. Initial conditions may include the voice hub 112 already having an IP address using the IMS APN and a session association with the P-CSCF 144 before this process begins. In keeping with the previous example, the voice hub 112 is using the local LTE network as a home user (e.g., the voice hub 112 is part of the Visited LTE Network 300a). However, the voice hub 112 may be using the local LTE network as either a home user or a roaming user (e.g., the voice hub 112 may be part of the HPMN 200 or the VPMN 300). The mobile station 114 may already associate itself with the voice hub 112, and the registration to its home IMS (e.g., the Home IMS Network 200a) has occurred as described in FIG. 2. In one example, the Home IMS Network 200a receives an incoming call for the mobile station 114. The Home IMS Network 200a knows the user is registered in the Visited IMS Network 300a and can be reached via the P-CSCF 144. The call control signaling (SIP) is sent to the mobile station 114 from the Home IMS Network 200a via the local or visited P-CSCF 144. The P-CSCF 144 knows that the mobile station 114 is associated with the voice hub 112, and the users connected via WiFi to the voice hub 112 use the same LTE access connection.

The P-CSCF 144 behaves like an AF in the LTE reference model and requests for a modification of QoS bearer in the Visited LTE Network 300a between the voice hub 112 and the PGW 136 on behalf of the mobile station's 114 Home IMS Network 200a (Step 720). The modification of the QoS bearer request may have adequate GBR and delay/Jitter parameters to support multiple voice and/or video conversation (e.g., conversation between the mobile station 114 and the mobile station 303 and conversation between the mobile station 110 and the mobile station 302). Using the 3GPP Rx interface, the P-CSCF 144 requests that a dedicated bearer session be modified in the Visited LTE Network 300a. The PCRF 144 asks the PGW 136 in the local LTE network to increase the GBR bandwidth of the conversational voice bearer with the voice hub's 112 IP address associated with the IMS APN, using the GBR and QCI parameters as requested by the P-CSCF 144 in step 720. This is requested using the 3GPP Gx interface between the PCRF 134 and the PGW 136. Prior to requesting the bearer, the PCRF 134 may check whether the voice hub 112 is authorized to request such modification of the bearer.

The PGW 136 confirms the authorization of bearer modification request to the PCRF 134 (Step 724) and commences to modify the bearer in the Visited LTE Network 300a. The PCRF 134 confirms the bearer creation to the P-CSCF 144 using the Rx interface (Step 726), which in turn relays the authorization to the mobile station's 114 Home IMS Network 200a. The PGW 136 requests the SGW 132 to modify the existing bearer established with the voice hub 112 to ensure enough resources are allocated for the two simultaneously ongoing calls (Step 728). Flow information is updated to include information (e.g., IP addresses and port(s)) used to carry media for second call in additional to set of addresses and ports used for the first call. The SGW 132 requests the MME 315 to modify an E-UTRAN radio access bearer (E-RAB) in the eNB 150 where the voice hub 112 is currently physically located using the 3GPP S11 interface (Step 730).

The MME 315 determines the correct eNB 150 in which to modify the E-RAB based on tracking the mobile station's 114 location throughout the network. The MME 315 sends an E-RAB modify request to the target eNB 150 using the 3GPP S1-MME control interface (Step 732). The target eNB 150 checks that it has adequate resources (available spectrum, processing power, etc.) to service the MME's 315 request for the upgraded dedicated LTE bearer. Assuming it does, eNB 150 relays the request to the voice hub 112 over the LTE air interface (LTE-uu) via the RRC-Conn-Reconfig message (Step 734).

The voice hub 112 confirms that it will reconfigure the session to accommodate the requested bearer by responding to the eNB 150 with the RRC-Conn-Reconfig-Complete message (Step 736). The eNB 150 confirms the bearer setup to the MME 315 using the E-RAB-Modify-Response message (Step 738). The voice hub 112 modifies its LTE-uu configuration parameters to accommodate the dedicated QoS bearer associated with the additional voice and/or video traffic including the appropriate IP port information for the EPS bearer. The voice hub 112 communicates these parameters to the eNB 150 using the UL-Info-Transfer message as indicated, carrying NAS signaling information destined for the MME 315 (Step 740). Independent of the LTE signaling, the voice hub 112 associates this stream of data with the mobile station's 114 connected to the voice hub 112 via WiFi.

The eNB 150 relays the NAS signaling information to the MME 315, and modifies the dedicated LTE media bearer with the voice hub 112 (Step 742). The MME 315 interprets the NAS information from the voice hub 112 with the appropriate IP port numbers containing the specified dedicated bearer and relays the relevant information to the SGW 132 (Step 744). The SGW 132 relays the updated IP bearer information to the PGW 136 and modifies the media bearer context with the eNB 150 and the PGW 136 corresponding to the dedicated bearer for the voice and/or video call (Step 746). The media path associated with the call is now associated with the voice hub's 112 IP address and the call media path is complete.

To this end, the instant application describes a voice hub having rudimentary web server capabilities—typically available on WiFi access points and routers to enable browser based setup by a connected mobile station (or PC). The voice hub may offer the radio technologies and frequencies that the user of the mobile station may encounter in various LTE networks in different countries. The voice hub may be configured to bridge the user's mobile station into the visited LTE network and may assure the same or substantially same QoS the user receives from the user's home network.

The mobile station (or PC) may have wireless HTTP browser and/or application capabilities—typical of smart phones. The voice hub may be prescribed to include a specific combination of letters prior to customization, e.g., the word VOLTE may be first few letters if the voice hub is capable of the VoLTE handshake. Additional letters in the SSID can be pre-programmed and fixed in the device (unique to each device) or potentially can be customized by the user.

The voice hub may support a fixed IP address for its web server facing the WiFi side of the voice hub (e.g. 192.168.1.2). This IP address may be used exclusively for the handshake negotiation with VoLTE capable WiFi devices (e.g., the mobile station). After being turned on and connected with the LTE network (including IMS registration with the visited network), the voice hub may broadcast its SSID (e.g., VOLTExxxx) over its WiFi interface. The user may set up the mobile station to attach to the voice hub's WiFi in the normal method, choosing the mobile station's WiFi setup mechanism. When the mobile station scans for available WiFi networks, the mobile station may see the VOLTExxxx SSID and may display that on the screen as one of possibly several available WiFi networks. The user may then choose the VOLTExxxx SSID and request a connection.

The mobile station may automatically see that the chosen SSID begins with VOLTE and may launch a handshake application. In keeping with the previous example, the mobile station may attempt to connect with the voice hub's web server at 192.168.1.2. Upon successful connection with the voice hub's web server, the mobile station may present a popup message to the user such as "you are connected to a voice compatible LTE router, would you like to register for voice services?" If the user chooses "yes," the mobile station relays this choice to the voice hub with relevant IMS registration information (IMSI, MDN, MS-ISDN), using a secure https interface with the Jetpack's web server.

Using the LTE air interface, the voice hub may attempt to confirm the registration with the user's home IMS as defined in the call flows. If the registration is successful, the voice hub's web server may send a message to the mobile station indicating something like "the voice registration was successful and you are now able to send and receive calls from your device." For calls, the voice hub may relay SIP messages and standard VoLTE protocols over the WLAN interface to the mobile station. If the mobile station loses its WiFi connection to the voice hub, the voice hub may de-register the user from the IMS so that the IMS does not attempt to deliver any further calls to the mobile station. In this manner, the voice hub may bridge the user's mobile station into the visited LTE network and may assure the same or substantially same quality of service (QoS) the user receives from the user's home network.

As known in the data processing and communications arts, a general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code for the intelligent messaging system. The software code is executable by the general-purpose computer that functions as a web server, application server(s) and/or MMEs, proxies, HHSs, etc. In operation, the code is stored within the general-purpose computer platform. At other times, however, the software may be stored at other locations and/or transported for loading into the appropriate general-purpose computer system. Execution of such code by a processor of the computer platform enables the platform to implement the methodology to determine if a mobile station can roam in a visiting network without communication with the home network, in essentially the manner performed in the implementations discussed and illustrated herein.

A wireless mobile communication network between the mobile station 110 and the base station 150 might be implemented as a network conforming to the code division multiple access (CDMA) IS-95 standard, the 3rd Generation Partnership Project 2 (3GPP2) wireless IP network standard or the Evolution Data Optimized (EVDO) standard, the Global System for Mobile (GSM) communication standard, Universal Mobile Telecommunications System (UMTS), High Speed Pack Access (HSPA), a time division multiple access (TDMA) standard or other standards used for public mobile wireless communications. The mobile station 110 may be capable of conventional voice telephone communications and data communications. A variety of different types of mobile stations supporting such communications are widely available. Today, mobile stations typically take the form of portable handsets, smart-phones or personal digital assistants, although they may be implemented in other form factors.

Figure 7:
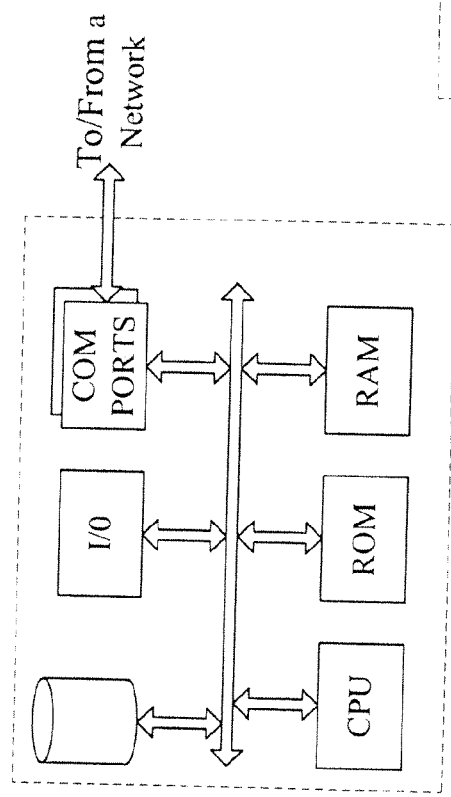
FIG. 7 is a simplified functional block diagram of a computer that may be configured to function as any of the devices of FIG. 1.
Figure 8:
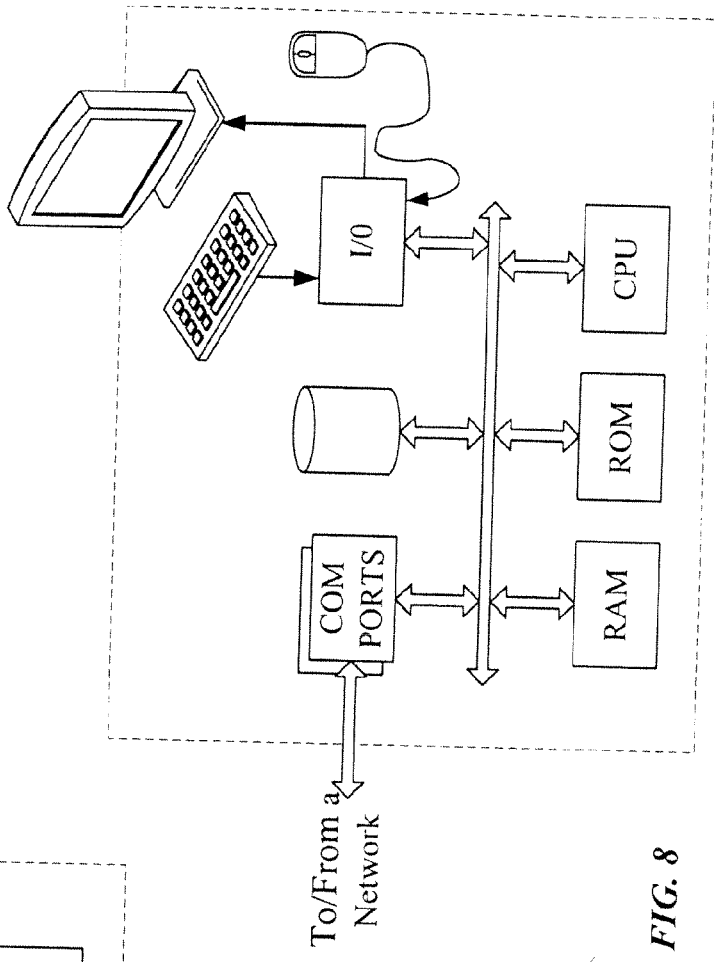
FIG. 8 is a simplified functional block diagram of a personal computer or other work station or terminal device that may be configured to function as any of the devices of FIG. 1.

FIGS. 7 and 8 provide functional block diagram illustrations of general purpose computer hardware platforms for at least the HSS. FIG. 7 illustrates a network or host computer platform, as may typically be used to implement a server. FIG. 8 depicts a computer with user interface elements, as may be used to implement a personal computer or other type of work station or terminal device, although the computer of FIG. 8 may also act as a server if appropriately programmed. It is believed that those skilled in the art are familiar with the structure, programming and general operation of such computer equipment and as a result the drawings should be self-explanatory.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers and terminal device computers are conventional in nature, and it is presumed that those skilled in the art are adequately familiar therewith. Of course, the server functions may be implemented in a distributed fashion on a number of similar platforms, to distribute the processing load.

Hence, aspects of the methods of roaming control, as outlined above, may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable the transmission of the S6a message. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible, non-transitory "storage" media, terms such as computer or machine "readable medium" refer to any medium that participates in providing instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. Other implementations are contemplated. For example, the voice hub can provide other services without requiring the mobile device to use the LTE network. Specifically, although the call flows are specific to LTE, the basic concept can be applied to any wide area network (wire line or wireless) that supports bearer-based quality of service.

It is intended by the following claims to claim any and all applications, modifications and variations that fall within the true scope of the present teachings. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising steps of:
broadcasting, by a router over a WiFi network, an identifier of the router to a mobile station, the router being configured to support a plurality of Long Term Evolution (LTE) radio frequency bands;
receiving, over the WiFi network, a connection request at the router from the mobile station;
determining, at the router, whether the mobile station is authorized to use the router for connecting to a LTE network with which the router is connected, the LTE network being serviced by a network provider in which the mobile station does not have a subscription and the router being connected to the LTE network via a LTE radio frequency band not supported by the mobile station;
upon determining the mobile station is authorized to use the router for connecting to the LTE network, establishing a WiFi connection with the mobile station;
receiving, at the router and from the mobile station, registration information for receiving a media service on the LTE network;
sending the registration information to the LTE network for authentication; and
upon successful authentication of the registration information, providing the mobile station with the media service using the router regardless of a difference in operating frequency between the LTE network and the mobile station.

2. The method of claim 1, wherein providing the mobile station with the media service includes providing the mobile station with the media service using a Mobile Directory Number (MDN) assigned to the mobile station by a home network of the mobile station to which the mobile station subscribes, the home network being different from the LTE network.

3. The method of claim 1, wherein the LTE network is a network serviced by a network provider in which the router has its subscription.

4. The method of claim 1, wherein the LTE network is a network serviced by a network provider in which the router does not have its subscription.

5. The method of claim 1, further comprising:
informing a user of the mobile station of an availability of the media service over the established WiFi connection;
responsive to informing the user of the availability of the media service, receiving from the mobile station a request to use the media service over the established WiFi connection; and
responsive to the request, querying the mobile station for the registration information for the media service on the LTE network.

6. The method of claim 5, wherein receiving the registration information includes receiving the registration information responsive to querying the mobile station for the registration information for the media service on the LTE network.

7. The method of claim 1, wherein the registration information includes an MDN associated with the mobile station.

8. The method of claim 1, wherein broadcasting the identifier includes broadcasting an identifier reflecting the router is a voice compatible LTE router.

9. The method of claim 1, further comprising establishing a proper Quality of Service (QoS) bearer between the router and the LTE network based on a voice over internet protocol (VoIP) or video session policy received from a home internet protocol (IP) multimedia services (IMS) network of the mobile station.

10. The method of claim 9, further comprising;
receiving, over the WiFi network and while the router is serving the mobile station, a second connection request at the router from a second mobile station;
determining at the router, whether the second mobile station is authorized to use the router for connecting to the LTE network;
upon determining the second mobile station is authorized to use the router for connecting to the LTE network, establishing a WiFi connection with the second mobile station;
receiving, at the router and from the second mobile station, registration information for receiving the media service on the LTE network;
sending the registration information to the LTE network for authentication; and
upon successful authentication of the registration information, enabling the second mobile station to receive the media service using the router regardless of the operating frequency of the LTE network.

11. The method of claim 10, further comprising modifying the established QoS bearer between the router and the LTE network to ensure adequate resources are available for media traffic associated with multiple attached mobile stations.

12. A router comprising:
a WiFi local area wireless data communications interface;
a wide area wireless data communications interface configured to support a plurality of Long Term Evolution (LTE) radio technologies and frequencies;
a processor; and
a memory storing executable instructions for causing the processor to:
enable, via the wide area wireless data communications interface, a connection between the router and a LTE network;
broadcast, over a WiFi network via the WiFi local area wireless data communications interface, an identifier of the router to a mobile station;
receive, over the WiFi network, a connection request from the mobile station;
determine whether the mobile station is authorized to use the router for connecting to the LTE network;
upon determining the mobile station is authorized to use the router for connecting to the LTE network, establish a WiFi connection between the router and the mobile station;
receive from the mobile station registration information for media service on the LTE network;
send the registration information to the LTE network for authentication; and
upon successful authentication of the registration information, provide the mobile station with the media service using the router regardless of a difference in operating frequency between the LTE network and the mobile station,
wherein:
the LTE network is a network serviced by a network provider in which the mobile station does not have a subscription; and
the connection between the router and the LTE network is via a LTE radio frequency band not supported by the mobile station.

13. The router of claim 12, wherein the memory further stores executable instructions for causing the processor to provide the mobile station with the media service using a Mobile Directory Number (MDN) assigned to the mobile station by a home network of the mobile station to which the mobile station subscribes, the home network being different from the LTE network.

14. The router of claim 12, wherein the LTE network is a network serviced by a network provider in which the router has its subscription.

15. The router of claim 12, wherein the LTE network is a network serviced by a network provider in which the router does not have its subscription.

16. The router of claim 12, wherein the memory further stores executable instructions for causing the processor to establish a proper quality of service (QoS) bearer between the router and the LTE network based on a voice over internet protocol (VoIP) session policy received from a home network of the mobile station.

17. The router of claim 16, wherein the memory further stores executable instructions for causing the processor to
receive, over the WiFi network while serving the mobile station, a second connection request from a second mobile station;
determine whether the second mobile station is authorized to use the router for connecting to the LTE network;
upon determining the second mobile station is authorized to use the router for connecting to the LTE network, establish a WiFi connection with the second mobile station;
receive from the second mobile station registration information for receiving the media service on the LTE network;
send the registration information to the LTE network for authentication; and
upon successful authentication of the registration information, enable the second mobile station to receive the media service using the router regardless of the operating frequency of the LTE network.

18. The router of claim 17, wherein the memory further stores executable instructions for causing the processor to modify the established QoS bearer between the router and the LTE network to ensure adequate resources are available for media traffic associated with multiple mobile stations.

19. A system, comprising:
a mobile station configured to:
support a first Long Term Evolution (LTE) radio frequency band supported by a first wireless mobile communications network and not supported by a second wireless mobile communications network, the mobile station being subscribed to services provided by the first wireless mobile communications network; and
not support a second LTE radio frequency band supported by the second wireless mobile communications network; and
a router configured to support a plurality of LTE radio frequency bands including at least the second LTE radio frequency band, comprising:
a WiFi local area wireless data communications interface;

a wide area wireless data communications interface configured to support the plurality of LTE radio frequency bands including the second LTE radio frequency band;

a processor; and a memory storing executable instructions for causing the processor to:

enable, via the wide area wireless data communications interface, a connection between the router and the second wireless mobile communications network via the second LTE radio frequency band;

broadcast, over a WiFi network via the WiFi local area wireless data communications interface, an identifier of the router to the mobile station;

receive, over the WiFi network, a connection request from the mobile station;

determine whether the mobile station is authorized to use the router for connecting to the second wireless mobile communications network via the second LTE radio frequency band;

upon determining the mobile Station is authorized to use the router for connecting to the second wireless mobile communications network via the second LTE radio frequency band, establish a WiFi connection between the router and the mobile station;

receive, over the WiFi network and from the mobile station, registration information for media service provided via the second wireless mobile communications network;

send, via the wide area wireless data communications interface and the second LTE radio frequency band, the registration information to the second wireless mobile communications network for authentication; and upon successful authentication of the registration information, provide the mobile station with the media service via the second wireless mobile communications network.

20. The system of claim 19, wherein the instructions stored in the memory of the router further cause the processor to:

establish a proper quality of service (QoS) bearer over the second LTE frequency band between the router and the second wireless mobile communications network based on a voice over internet protocol (VoIP) session policy received from a home network of the mobile station.

* * * * *